United States Patent [19]

Raas et al.

[11] 4,076,144
[45] Feb. 28, 1978

[54] TOP CLOSURE FOR CONTROL ROD DRIVE FOR NUCLEAR REACTOR

[75] Inventors: Jean H. Raas, Lancaster; Joseph I. Schwartz, Columbus, both of Ohio

[73] Assignee: Diamond Power Specialty Corporation, Lancaster, Ohio

[21] Appl. No.: 692,386

[22] Filed: Jun. 3, 1976

[51] Int. Cl.² .............................................. B65D 51/16
[52] U.S. Cl. .................................... 220/367; 220/288
[58] Field of Search ................. 220/367, 327, 288; 74/424.8

[56] References Cited

U.S. PATENT DOCUMENTS 2,857,142 8/1955 Gertzon ............................... 220/367
3,465,911 9/1969 Coharusso et al. .................. 220/367

Primary Examiner—George T. Hall
Attorney, Agent, or Firm—Harness, Dickey & Pierce

[57] ABSTRACT

A removable top closure and venting assembly for the tubular housing of a control rod drive includes a mounting ring threadably inserted in the upper end of the housing, a fluid-sealing closure member beneath the mounting ring and which is mounted in and coupled to the mounting ring by means of a ball and socket joint, a gas vent defined by interconnecting passages extending through the closure and through the ball and socket joint, and a vent valve accesible from the top of the closure assembly.

3 Claims, 2 Drawing Figures

TOP CLOSURE FOR CONTROL ROD DRIVE FOR NUCLEAR REACTOR

BACKGROUND OF THE INVENTION

Control rod drives for nucelar reactors typically include a tubular housing which communicates internally with and is upstanding from the reactor vessel and which must normally be kept tightly sealed, although provision for access to the interior must be made, as well as provision for venting air and other gases from the top. Top closure means which maintains absolute sealed integrity is required, but it is desirable that the closure, and the venting means, be operable as quickly as is possible in order to minimize the exposure time of personnel during any necessary servicing.

The overall object of the present invention is to provide an improved top closure for control rod drives which provides reliable, uniform sealing but is quickly removable and replaceable, which incorporates improved venting means, and which is substitutable on existing standard commercial control rod drives without modifying other parts of the apparatus.

BRIEF DESCRIPTION OF THE FIGURES OF DRAWING

FIG. 1 is a diametric longitudinal sectional view of the upper end of a control rod drive assembly equipped with a closure and vent valve assembly constructed in accordance with the present invention; and FIG. 2 is a top plan view thereof.

DETAILED DESCRIPTION OF THE PREFERRED FORM OF THE INVENTION

Figures 1, 2:
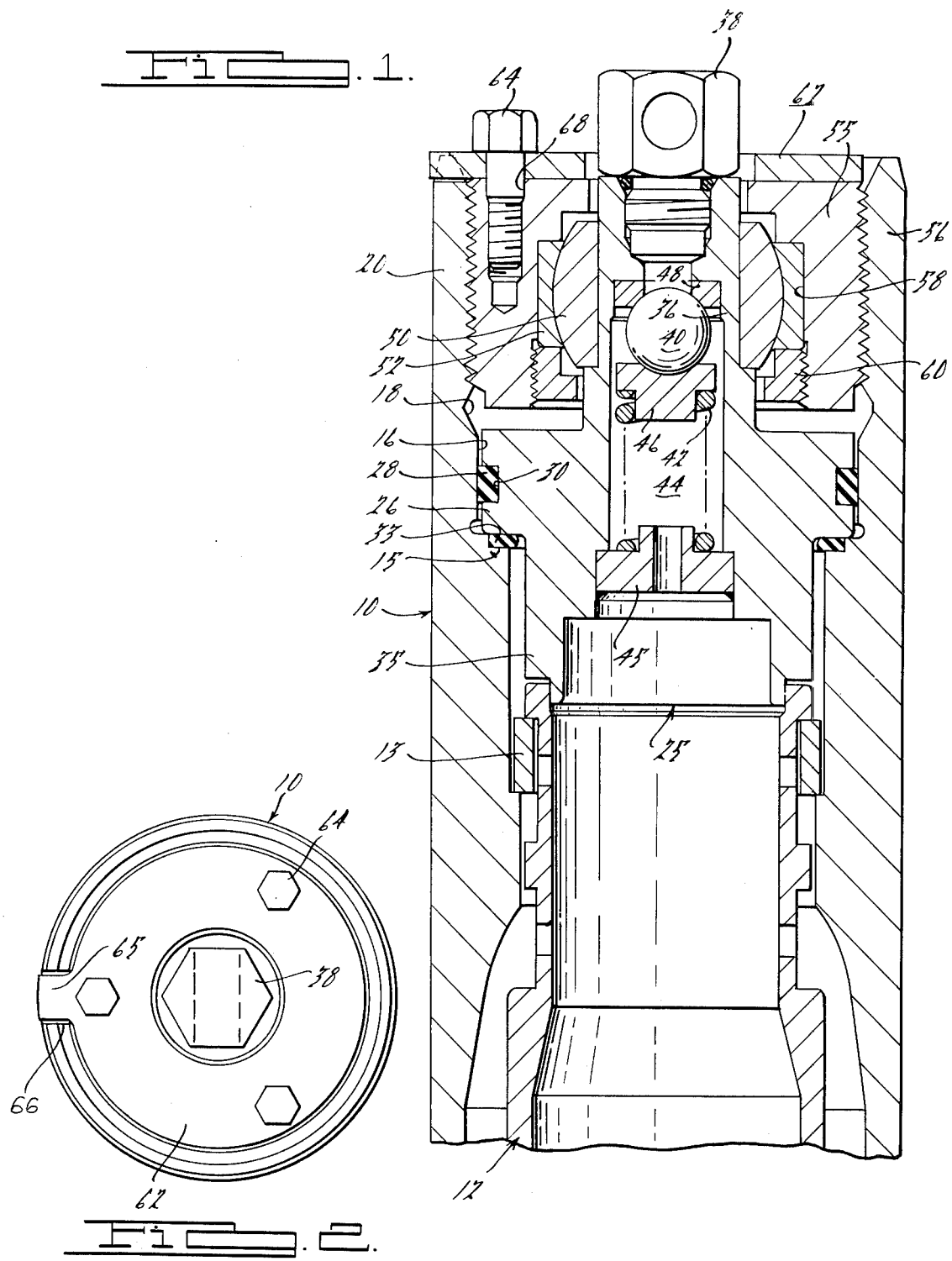

The present invention is adapted for use with a control rod drive of the type disclosed in U.S. Pat. No. 3,822,439, issued July 9, 1974. Control rod drives constructed in accordance with such patent are now in service and in commercial production, and the fact that the design and construction thereof have been proved satisfactory militates against unnecessary changes thereof in view of the importance of safety considerations in such apparatus. As disclosed in said patent, the top closure construction includes an annular mounting ring threaded into the upper end of the tubular housing a closure insert below the mounting ring and which carries both a peripheral seal adapted to sealingly engage a cylindrical internal wall of the housing and an end seal which is adapted to be forced against a shoulder in the housing. A plurality of jacking screws in the mounting ring are employed to force the insert into sealed position and compress the end seal. By means of the jacking screws, the closure insert can be accurately angularly adjusted in a manner which uniformly and accurately forces it into proper position to insure effective sealing. Although such prior arrangement enables proper sealing of the housing, the time required to operate the several jacking screws is substantial, and considerable care and accuracy of manipulation are required. It will be appreciated that these factors make it necessary that service personnel, during such operations, remain in areas where exposure to radiation may occur for relatively long periods. The present invention requires no changes whatever in the construction of the control rod drive other than the top closure assembly, and provides a readily substitutable unit which can be installed and removed much more quickly, and which automatically, and without requiring the exercise of a high degree of skill, assures uniform seating of the closure and effective sealing of the housing.

As shown in FIGS. 1 and 2, wherein only the upper portion of the control rod drive assembly is illustrated, the drive comprises a tubular housing generally designated 10, of circular cross section, spacedly concentrically disposed within which is a tubular torque tube assembly generally designated 12, the upper end of which is spaced below the top of the housing 10. The torque tube is located in the housing by a supporting ring 13. Above the top of the torque tube assembly the housing is counterbored and provided with a smoothly and accurately finished and located, upwardly facing shoulder 15, immediately above which is a concentric smoothly surfaced cylindrical internal wall portion 16 joined by a conically flaring top 18 to an internally threaded upper end portion 20 of the counterbored area.

The improved closure assembly includes a closure insert, generally designated 25, having a piston-like head portion 26 of a diameter somewhat less than that of the cylindrical wall 16 and which carries a peripheral sealing ring 28 formed of a stable, deformable elastomer sealingly held in a groove 30 in the head 26 and proportioned to sealingly engage the wall portion 16. Head 26 also carries a bottom end sealing ring 33 which is adapted to be compressed downwardly by the head and sealingly engage the shoulder 15.

Integral with the head portion 26 is a downwardly extending hollow skirt portion 35, the end of which is telescoped into the upper end of the torque tube assembly 12. The internal opening defined by the skirt 35 extends upwardly to define a continuous vent passage from the interior of the housing 10 through the closure insert member to the exterior. The closure insert member includes a cylindrical neck portion 36 extending upwardly from the head portion 26 and terminating in an open upper end near the top of the housing 10, the upper end of the vent passage therein being internally threaded and normally closed and sealed by a screw closure plug 38 having an upstanding wrench-receiving head accessible at the top of the assembly. The internal vent passage in the closure insert is normally closed by a check valve ball 40 which is urged upwardly by a spring 42 trapped in a chamber 44 which forms a part of the vent passage and is retained by an annular spring retainer 45 at the bottom. At its upper end the spring acts through a thrust member 46 to urge the ball 40 into sealed engagement with seat member 48. In order to vent gas from the housing it is merely necessary to remove the plug 38 and push the ball 40 down off its seat with a suitable rod-like tool.

A spherically-surfaced annular bearing ring 50 is slidably fitted on the neck portion 36 and rockably fitted in a socket bearing ring 52 secured in an annular externally threaded mounting ring 55 threadably securable in the conformably internally threaded upper end portion 56 of the housing 10. The socket ring 52 is secured in a downwardly enlarged counterbored portion 58 of the mounting ring 55 by means of a clamping ring 60 threaded in the conformably internally threaded lower end of the opening 58 in the mounting ring.

The mounting ring 55 is locked against unintended loosening by means of a lock plate 62 which is secured by screws 64 to the top of the ring 55 and which has a tongue 65 projecting into a radial slot 66 in the rim of the housing 10.

It will be noted that the axial openings (undesignated) in the upper portion of mounting ring 55 and in the plate 62 and clamping ring 60 are all greater in diameter than the outside diameter of the neck 36. The clearance thus provided between the neck and all of its supporting portions with the exception of the ball and socket joint defined by rings 50, 52, permits the closure insert 25 to have a limited rocking movement with respect to the rest of the structure. The ball and socket surface portions of rings 50, 52 overlap one another radially sufficiently so that by turning the mounting ring 55 the closure insert can be urged downwardly to compress the sealing ring 33.

The complete closure assembly, including the closure insert 25, the mounting ring 55, and the ball and socket joint elements can be preassembled, the ball and socket joint being first assembled into the ring 55 and secured by the locking ring 60, whereafter the neck 36 is slipped through the ring 50 from the bottom. These parts are then inserted in the top of the housing 10, prior to installation of the plate 62, the ring 55 being screwed down by means of a suitable spanner wrench inserted in the unthreaded upper portions 68 of the bolt holes in the ring 55 for the bolts 64. During the tightening down of the ring 55, the head 26 may rock to any such slight degree as might be necessary in order to assure uniform axial compression of the seal 33 about its peripheral extent, such compensation taking place automatically by virtue of the inclusion of the ball and socket joint. After the ring 55 is tightened, the locking plate 62 is installed to secure the parts against separation.

In event it becomes necessary to gain access to the interior of the drive, it is merely necessary to remove the locking plate 62, unscrew the ring 55 and pull out the assembly, and it will be appreciated that such removal and the replacement of the closure assembly can be effected very quickly and without danger that the parts will cock and bind.

This Detailed Description of Preferred Form of the Invention, and the accompanying drawings, have been furnished in compliance with the statutory requirement to set forth the best mode contemplated by the inventors of carrying out the invention. The prior portions consisting of the "Abstract of the Disclosure" and the "Background of the Invention" are furnished without prejudice to comply with administrative requirements of the Patent and Trademark Office.

What is claimed is:

1. A closure assembly for a tubular control rod drive housing of circular cross section comprising an annular mounting ring threadably insertable in and removable from the end of the housing and means for sealing the housing and the central opening of the annulus defined by such ring, at a position below the ring, including a closure insert having a sealing head slidably sealably engageable with the interior of the housing, characterized by a neck portion extending outwardly through and rockable in said opening, and a ball and socket joint in the neck portion of the ring and connecting the ring and insert for axial movement as a unit but permitting rocking of the insert and rotation of the ring independently of the insert.

2. A closure assembly as defined in claim 1 wherein said neck has an end exposed to the outside through said central opening in the ring, and a vent passage extending through said assembly via the neck from the interior of the housing to the exterior, further characterized by a valve in said neck normally closing said passage and operable from said exposed end.

3. A closure assembly as defined in claim 1 for use with a housing having a shoulder facing said end and against which the sealing head is adapted to seat, the ball and socket joint having axially overlapping parts carried by the ring and neck respectively and held against unwanted axial movement relatively thereto, whereby the sealing head may be urged against said shoulder by rotation of the ring.

* * * * *